United States Patent
Cheng et al.

(10) Patent No.: US 9,967,248 B1
(45) Date of Patent: May 8, 2018

(54) SYSTEM FOR AUTHENTICATING AND PROCESSING SERVICE REQUESTS

(71) Applicant: AMAZON TECHNOLOGIES, INC., Seattle, WA (US)

(72) Inventors: Yu-Hsiang Cheng, Bothell, WA (US); Siddhartha Shankara Rao, Seattle, WA (US); Robert Dale Francis, Seattle, WA (US); Da Chen, Seattle, WA (US); Ruoyu Fei, Kirkland, WA (US); Jingyu Ji, Seattle, WA (US); Christopher Chad Lake, Seattle, WA (US); Alan Lau, Kirkland, WA (US); Hanyu Liu, San Mateo, CA (US); Ajaykumar Selvaraj, Bellevue, WA (US); Haifeng Xu, Seattle, WA (US)

(73) Assignee: Amazon Technologies Inc., Seattle, WA (US)

( * ) Notice: Subject to any disclaimer, the term of this patent is extended or adjusted under 35 U.S.C. 154(b) by 172 days.

(21) Appl. No.: 14/980,350

(22) Filed: Dec. 28, 2015

(51) Int. Cl.
*H04L 29/06* (2006.01)

(52) U.S. Cl.
CPC ........ *H04L 63/083* (2013.01); *H04L 63/0869* (2013.01)

(58) Field of Classification Search
CPC ... H04L 63/083; H04L 63/08; H04L 63/0876; H04L 63/102; H04W 12/06
See application file for complete search history.

(56) References Cited

U.S. PATENT DOCUMENTS

| | | | | |
|---|---|---|---|---|
| 7,734,527 | B2* | 6/2010 | Uzo | G06Q 20/06 235/383 |
| 8,245,048 | B2* | 8/2012 | Chai | H04L 9/3271 713/170 |
| 8,245,052 | B2* | 8/2012 | Bjorn | G06F 21/35 713/159 |
| 8,341,714 | B2* | 12/2012 | Muller | G06F 21/34 380/229 |
| 8,453,218 | B2* | 5/2013 | Lan | H04L 63/0407 726/4 |
| 8,707,405 | B2* | 4/2014 | O'Donnell | G06F 21/335 726/10 |
| 8,788,835 | B2* | 7/2014 | Cook | G06F 21/34 713/184 |
| 8,966,599 | B1* | 2/2015 | Barrows | H04L 63/08 705/37 |
| 2009/0319669 | A1* | 12/2009 | Murai | G06F 17/24 709/227 |

(Continued)

*Primary Examiner* — Yonas Bayou
(74) *Attorney, Agent, or Firm* — Lindauer Law, PLLC

(57) ABSTRACT

Described are techniques for establishing secure communication channels between user devices and service providing devices. Correspondence between a request received from a user device and security data may be used to determine that the user device has provided a valid access credential. The access credential may be replaced with a subsequent access credential after use. Correspondence between the request and service data may be used to determine that the request may be processed by the receiving service and that the user device has the permissions necessary for the request to be processed. Portions of the request that meet these criteria may be provided to the service. The secure communication channel may also be used to provide the response from the service to the user device.

20 Claims, 7 Drawing Sheets

(56) References Cited

U.S. PATENT DOCUMENTS

| | | | |
|---|---|---|---|
| 2012/0079551 A1* | 3/2012 | Isozaki | H04N 21/4104 |
| | | | 725/118 |
| 2012/0131354 A1* | 5/2012 | French | G06F 21/602 |
| | | | 713/189 |
| 2013/0007856 A1* | 1/2013 | Bennett | G06F 21/33 |
| | | | 726/6 |
| 2016/0057139 A1* | 2/2016 | McDonough | H04L 63/0861 |
| | | | 726/6 |

* cited by examiner

SYSTEM FOR AUTHENTICATING AND PROCESSING SERVICE REQUESTS

BACKGROUND

Communications between services and client devices may include various security features, which may be unique to particular services and client devices.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
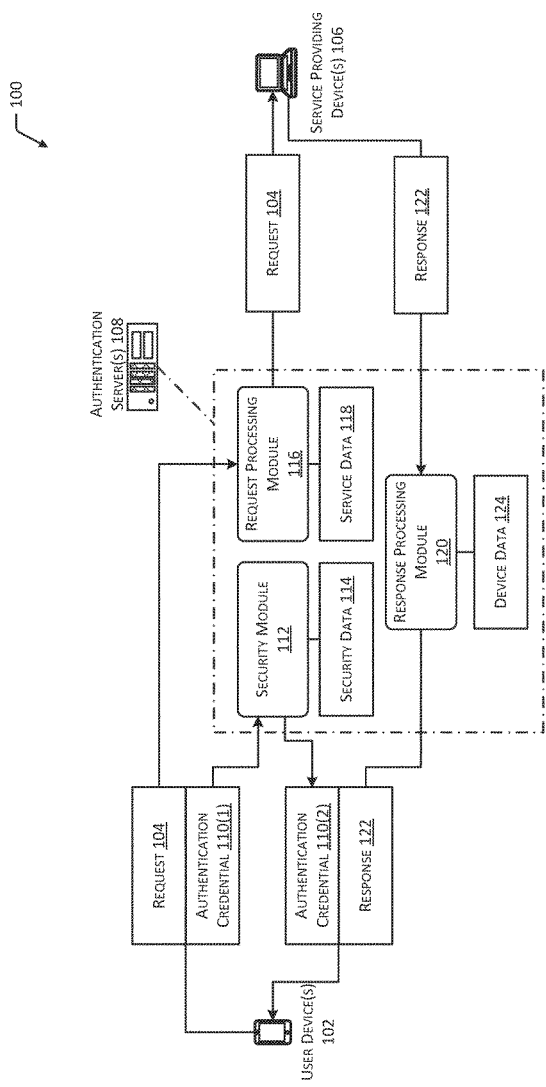
FIG. 1 depicts a system for establishing a secure communication channel with a user device and authenticating requests provided to a service providing device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

To acquire a desired output, a user device, or another type of computing device or process, may provide a request to a service executing on a computing device. The service may, in turn, provide a response to the requesting device. In some cases, the request may be accepted, and the requested output may be generated and provided to the requesting device. In other cases, the request may be rejected, such as due to an error in the request or a failure of the requesting device to properly address one or more security features associated with the requested service. For example, a particular service may be configured to accept certain types of requests from certain user devices, such as hypertext transfer protocol (HTTP) GET request, while rejecting other types of requests, such as a HTTP PUT request. As another example, particular user devices may be permitted to provide certain types of requests, while other user devices are permitted to provide other types of requests. A service may frequently reject requests of a type that the service is not configured to process or requests from user devices that lack the appropriate security features to provide particular types of requests. The configurations, security features, and access permissions associated with each service may vary significantly, as may the configurations, security features, access credentials, and capabilities associated with each requesting device.

This disclosure relates to techniques for creating a secure communication channel between user devices and services that may be used to authenticate user devices and prevent the transmission of erroneous or prohibited requests to services. For example, a centralized computing device or network of computing devices may be used to regulate communications between user devices and service providing devices. Service owners may provide the system with service data indicative of characteristics of requests or user devices that may be permitted or prohibited from accessing a service. For example, a service may be configured to accept particular request types (e.g., a HTTP GET request), but reject other request types (e.g., a HTTP PUT or POST request). As another example, a service may be configured to accept certain types of requests from certain types of user devices or particular user devices, but reject other types of requests from other user devices. As yet another example, a service may be configured to accept certain types of requests from user devices located in a particular location or requests that are provided to the service device via a particular route. Additionally, a service may be configured to reject requests associated with a particular location or route.

Upon a first attempt to access the system a user device may provide authentication data, such as a password, a token, a cookie, a certificate, or another type of access credential or security feature. In some implementations, the user device may be authenticated using a multi-factor authentication scheme. For example, at least a portion of the authentication data provided by the user device may be generated external to the system, such as a knowledge-based factor that may be used to identify a user or the user device. One or more other portions of the authentication data may include possession-based factors that may be used to verify the user device. After authentication of the user device, a first authentication credential, such as a token, may be generated and provided to the user device. The user device may be configured to provide the first authentication credential to the system concurrent with a request to access a service. The system may maintain security data that associates device identifiers of user devices with corresponding access credentials. If correspondence between the first authentication credential, the device identifier of the user device, and the security data is determined, a communication channel may be established with the user device.

After the user device has been authenticated, correspondence may be determined between the service data and one or more of request data indicative of characteristics of the request or device data indicative of characteristics of the user device. If correspondence between the request data or device data and the service data is determined, at least a portion of the request may be provided to the service. In some implementations, at least a portion of the request may be modified from a first format associated with the user device to a second format associated with the service. For example, the user device may provide a request using HTTP, while the service may process requests using Javascript object notation (JSON) or extensible markup language (XML). The service may then process the request, such as by determining that the request references existing content and the associated user device is permitted to access the requested content. The service may provide a response to the system, which may then provide at least a portion of the response to the user device. In some implementations, at least a portion of the response may be converted from a format used by the service to a format for use by the user device. By establishing a secure communication channel with the user device, a service may respond to requests associated with a sensitive or secure payload without requiring additional steps to be taken by the service provider. For example, responsive to a request received via the communication channel, a service may provide a secure, confidential, or restricted application, an update to the application, or an output associated with the application as a response. The secure communication channel may prevent access to a secure payload by devices that have not established trusted communications with the system and provided an expected authentication credential.

The authenticated credentials associated with the user device may be rotated after each use. For example, after receipt of a request accompanied by the first authenticated credential, a second authenticated credential may be generated and provided to the user device, separately from or concurrently with the response. The security data may be modified to include an indication of the second authenticated credential and remove the indication of the first authenticated credential. In some implementations, the first authenticated credential may remain valid until confirmation of receipt of the second authenticated credential is received from the user device. For example, if the user device provides multiple requests concurrently or close-in-time, a second request accompanied by the first authenticated credential may be received after the second authenticated credential has been provided to the user device. Retaining the indication of the first authenticated credential in the security data may enable additional requests by the user device to be authenticated until confirmation data associated with the second authenticated credential is received from the user device. In some implementations, the authentication credentials may also expire after a particular length of time has elapsed. For example, an authentication credential may become invalid thirty days after its creation, after which a subsequent authentication credential may replace the current authentication credential.

If an improper authentication credential is received from a device, such as if a malicious party intercepts an authentication credential, a mismatch between the authentication credential and the security data will be determined. Responsive to the mismatch, a control action may be performed. Control actions may include generation of notifications or reports, deletion of data associated with a requesting device, termination of communication with a device, invalidation of an authentication credential, replacement of an authentication credential, the addition of a device identifier to a threat list or similar data indicative of malicious entities, and so forth. In the event that a malicious party obtains a valid authentication credential, the authentication credential will become invalid after a single use, limiting the damage that may be caused by the malicious party. In some implementations, a user device may provide a notification indicative of a security failure, such as a when a device or authentication credential is known to have been lost or stolen, responsive to which a control action may be performed. For example, responsive to a notification, the authentication credential(s) associated with the user device may be invalidated and data associated with the user device may be deleted. Continuing the example, at least a portion of data associated with the user device may be encrypted. Deletion of data associated with the user device may include deletion of an encryption key used to access the data.

FIG. 1 depicts a system 100 for establishing a secure communication channel with a user device 102 and authenticating requests 104 provided to a service providing device 106. A user device 102 may provide, to an authentication server 108, a request 104 to access a service associated with a service providing device 106. The user device 102, the service providing device 106, and the authentication server 108 may include any number and any type of computing device, including, without limitation mobile devices, set-top boxes, tablet computers, personal computers, wearable computers, servers, and so forth. The computing devices may communicate using one or more networks, such as local area networks (LANs), wireless LANs, wide area networks (WANs), wireless WANs, and so forth. Additionally, while FIG. 1 depicts the user device 102, service providing device 106, and authentication server 108 as separate devices, in other implementations, a single computing device may perform the functions of two or more of the user device 102, service providing device 106, or authentication server 108.

The request 104 may identify a particular service or service providing device 106 and the user device 102 providing the request 104. Additionally, the request 104 may include various characteristics (e.g., fields, headers, formats, etc.) and content (e.g., expressions, operations, queries, etc.). The request may also be provided to the authentication server(s) 108 concurrently with an authentication credential 110(1), such as a token, certificate, or other type of security feature. In some implementations, the authentication credential 110(1) may be provided to the authentication server(s) 108 prior to or subsequent to the request 104.

A security module 112 associated with the authentication server(s) 108 may determine correspondence between the received authentication credential 110(1) and security data 114. The security data 114 may associate one or more device identifiers, such as an identifier associated with the user device 102, with authentication credentials 110 that have previously been provided to the user devices 102 associated with the device identifiers. For example, the security data 114 may indicate that the authentication credential 110(1) has been previously provided to the user device 102, and therefore, communications from the user device 102 that lack the authentication credential 110(1) or that are provided with a different authentication credential 110 may be erroneous, malicious, or otherwise anomalous. If the authentication credential 110(1) received from the user device 102 does not correspond to the security data 114, the request 104 may be rejected by the security module 112. In other implementations, one or more other control actions may be undertaken. For example, responsive to receipt of an invalid authentication credential 110, the security module 112 may generate notifications or reports, delete data from the user device 102, prevent subsequent communications by the user device 102, add an indication of the user device 102 to a threat list or a similar repository of potentially malicious entities, and so forth. Continuing the example, data related to a particular service or secure communication channel stored on a user device 102 may be encrypted. Responsive to receipt of an invalid authentication credential 110, the security module 112 may provide a signal to a user device 102 that causes the user device 102 to delete an encryption key used to access the data related to the service or communication channel.

If the authentication credential 110(1) received from the user device 102 corresponds to the security data 114, the request 104 may be provided to a request processing module 116 associated with the authentication server(s) 108. The request processing module 116 may determine correspondence between at least a portion of the request 104 and service data 118. The service data 118 may associate service identifiers, such as an identifier indicative of the service providing device 106 or the service requested by the user device 102, with indications of request characteristics, device characteristics, or particular user devices 102 that may access the requested service or the service providing device 106. For example, a service may be configured to process certain types of requests while being unable to process others. As another example, a service may be configured to process certain types of requests for all users, but other types of requests only for particular user devices 102 or for user devices 102 having particular characteristics. If the request 104 received from the user device 102 does not correspond to the service data 118, the request processing module 116 may reject the request 104. In some implementations, the request processing module 116 may provide one or more notifications to the user device 102 indicative of the rejection or perform one or more other control actions. If the request 104 corresponds to the service data 118, at least a portion of the request 104 may be provided to the service providing device 106 indicated in the request 104. In some implementations, the request processing module 116 may modify the format of the request 104 from a first format associated with the user device 102 to a second format that may be processed by the service providing device 106.

In some implementations, the service data 118 may indicate particular context-based characteristics associated with a user device 102 that may determine whether a request 104 may be processed. For example, a request 104 may be provided to the service if the user device 102 is located in a first location but rejected if the user device 102 is located in a second location less secure than the first location. As another example, a request 104 may be provided to the service if the user device 102 includes one or more security features associated with the request 104, such as encryption, but may be rejected if the user device 102 lacks particular security features. Continuing the example, a score or other type of metric associated with a user device 104 or a request 102 may be determined based on one or more characteristics of the user device 104 or the request 102. Such characteristics may include a location of the user device 104, a route through which the request 102 is provided from the user device 104, security features of the user device 104, the particular service or particular output associated with the request 102, the format, fields, or expressions of the request 102, and so forth. Requests 104 may be processed or rejected based on the relationship between the score or other metric and a threshold value.

A response processing module 120 associated with the authentication server(s) may receive a response 122 provided by the service providing device 106, responsive to the request 104. In some implementations, the response processing module 120 may determine correspondence between at least a portion of the response 122 and device data 124 associated with the user device 102. For example, device data 124 may indicate particular characteristics or types of content associated with the response 122 that may be processed by the user device 102, and other types of content that may be rejected by the user device 102. In some implementations, the response processing module 120 may modify the format of the response 122 from a format associated with the service providing device 106 to a different format that may be processed by the user device 102. One or more portions of the response 122 that correspond to the device data 124 may be provided to the user device 102. In some implementations, the response 122 may include a confidential or sensitive payload, such as an application, an update to an application, or an output associated with an application executed by the service.

After the request 104 and the authentication credential 110(1) have been received by the authentication server(s) 108, the security module 112 may generate a second authentication credential 110(2) to be provided to the user device 102. In some implementations, the second authentication credential 110(2) may be provided to the user device 102 concurrent with the response 122. In other implementations, the second authentication credential 110(2) may be provided to the user device 102 prior to or subsequent to providing the response 122. The security module 112 may then modify the security data 114 such that a device identifier of the user device 102 is associated with the second authentication credential 110(2) and is no longer associated with the first authentication credential 110(1). In some implementations, the security module 112 may request confirmation from the user device 102 indicating receipt and preparation of the second authentication credential 110(2) for use prior to modifying the security data 114 to disassociate the user device 102 from the first authentication credential 110(1). For example, the user device 102 may provide one or more additional requests 104 to the authentication server(s) 108 prior to receipt or preparation of the second authentication credential 110(2). Continuing the example, the user device 102 may provide multiple requests 104 to the authentication server(s) 108 in a short span of time as part of a multi-step process. Awaiting confirmation from the user device 102 prior to modifying the security data 114 to disassociate the user device 102 from the first authentication credential 110(1) may prevent the rejection of valid requests 104 that are provided within a short time of one another.

Figure 2:
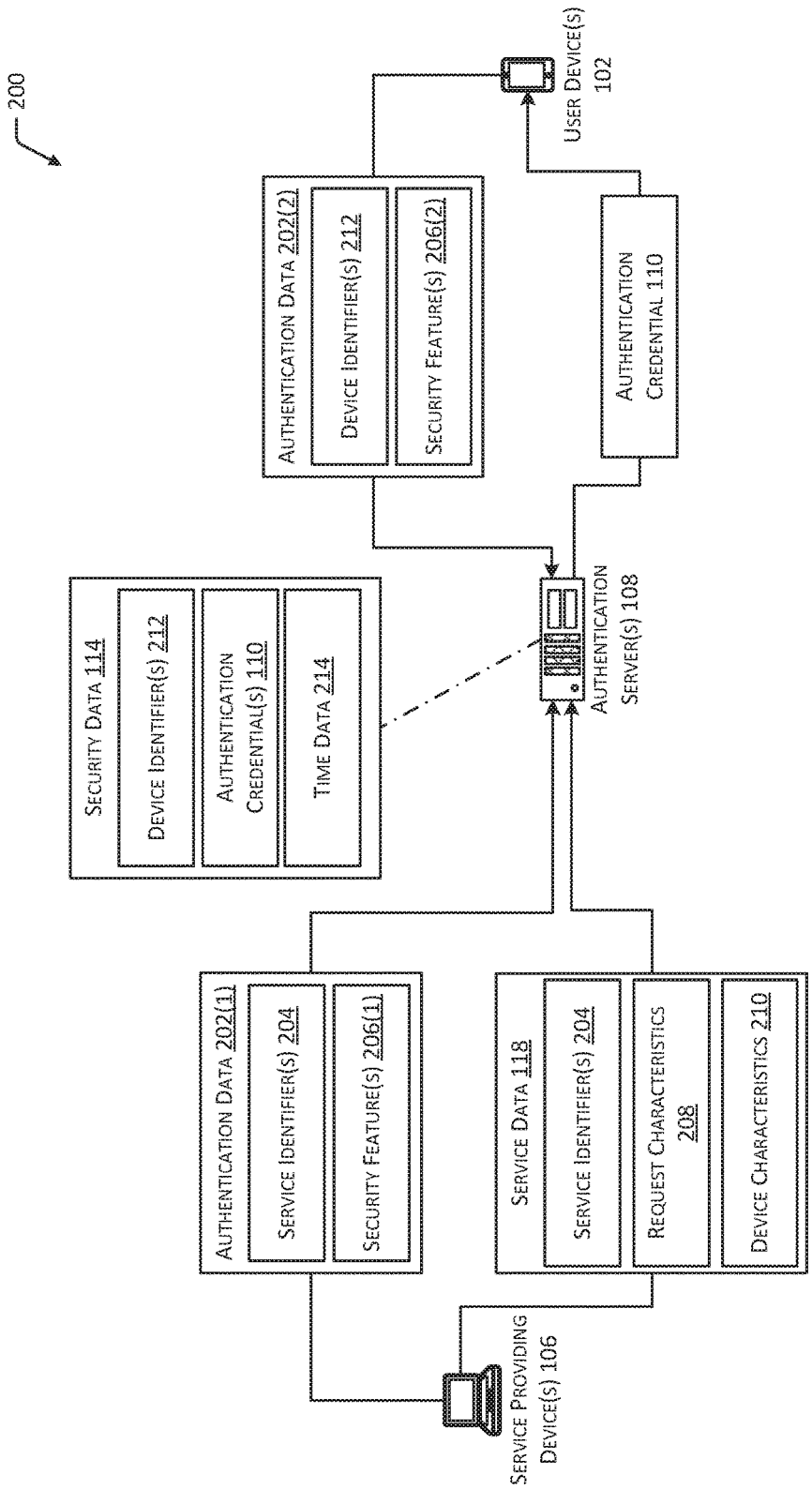
FIG. 2 depicts a system for establishing trusted communications with user devices and service providing devices.

FIG. 2 depicts a system 200 for establishing trusted communications with user devices 102 and service providing devices 106. For example, a service providing device 106 may register a service with the system 200 by providing authentication data 202(1) indicative of the service or the service providing device 106 and service data 118 indicative of the characteristics of the requests 104 or user devices 102 that may be processed by the service. The authentication data 202(1) may include one or more service identifiers 204 indicative of the service or the service providing device 106 associated with the service. For example, a service identifier 204 may include alphanumeric data, such as a name or alphanumeric string indicative of a service or service providing device 106, a network or device address such as an internet protocol (IP) address or media access control (MAC) address, and so forth. Service identifiers 204 may also include one or more of image data, audio data, or machine-readable data interpretable by a computing device that may not be readily understandable to a human user. The authentication data 202(1) may also include one or more security features 206(1). For example, the authentication data 202(1) received from a service providing device 106 may include one or more passwords, certificates, tokens, cookies, or other types of credentials. In some implementations, the service providing device 106 may be authenticated using an authentication, authorization, and accounting (AAA) framework or another type of multi-factor authentication process. For example, at least a portion of the authentication data 202(1) may include data generated external to the system 200.

In addition to authentication data 202(1), a service providing device 106 may provide service data 118 to the authentication server(s) 108. As described previously with regard to FIG. 1, the service data 118 may indicate particular request characteristics 208 or device characteristics 210 associated with requests 104 or user devices 102 that may be permitted to access a service. The request characteristics 208 or device characteristics 210 may be associated with one or more service identifiers 204 indicative of the service or service providing device 106. Request characteristics 208 may include features of a request 104, such as a type or category associated with the request 104, particular fields, extensions, expressions, or formats associated with the request 104, and so forth. For example, a service may be configured to process a HTTP "GET" request 104, but disallow a HTTP "PUT" request 104. In some implementations, request characteristics 208 may include a frequency or number of instances that a particular service was requested, a particular request 104 was provided, or a particular user device 102 provided a request 104. For example, one or more of a service providing device 106 or the request processing module 112 may attempt to restrict access to a service based on the access frequency or number of times a service has been accessed by a particular user device 102 or within a particular length of time. Device characteristics 210 may include features of a user device 102, such as a type of computing device, a location of the user device 102, a communication route associated with the user device 102 or the request 104, security features 206 associated with the user device 102, and so forth. In some implementations, device characteristics 210 may include indications of particular user devices 102, such as network addresses or other identifiers indicative of specific user devices 102.

A user device 102 may establish trusted communications with the system 200 by providing authentication data 202(2), responsive to which the user device 102 may be provided with an initial authentication credential 110. The initial authentication credential 110 may be used by the user device 102 when providing requests 104 to the authentication server(s) 108, until the authentication credential 110 is replaced by a subsequent authentication credential 110, as described previously with regard to FIG. 1. The authentication data 202(2) provided by the user device 102 may include one or more device identifiers 212 indicative of the user device 102. Device identifiers 212 may include alphanumeric data, such as a name or alphanumeric string indicative of a user device 102, a network or device address associated with the user device 102, and so forth. Device identifiers 212 may also include one or more of image data, audio data, or machine-readable data interpretable by a computing device that may not be readily understandable to a human user. The authentication data 202(2) provided by the user device 102 may also include one or more security features 206(2). The security features 206(2) provided by the user device 102 may include, without limitation, the same types of security features 206(1) provided by the service providing device 106. In some implementations, the user device 102 may be authenticated using an AAA framework or another type of multi-factor authentication process.

When an authentication credential 110 is generated and provided to a user device 102, the authentication server(s) 108 may generate or modify security data 114 that associates the device identifier(s) 112 of the user device 102 with the authentication credential 110 provided to the user device 102. As described previously with regard to FIG. 1, a security module 112 associated with the authentication server(s) 108 may determine correspondence between an access credential 110 received from a user device 102 and the security data 114. Based on the result of this determination, the request 104 may be rejected, one or more control actions may be performed, or the request 104 may be provided to the request processing module 116. In some implementations, the security data 114 may also include time data 214 indicative of a length of time or a particular time after which an authentication credential 110 may become invalid. For example, in addition to expiring after use, an authentication credential 110 may be configured to expire after a particular length of time, such as thirty days after generation. As another example, an authentication credential 110 may be configured to expire at a particular time. In some implementations, the authentication server(s) 108 may provide a subsequent authentication credential 110 to a user device 102 upon expiration of a preceding authentication credential 110. In other implementations, the authentication server(s) 108 may provide a notification to a user device 102 or another computing device upon expiration of an authentication credential 110. For example, a user device 102 may be requested to provide additional authentication data 202(2) before a subsequent authentication credential 110 is generated and provided to the user device 102 to replace an expired authentication credential.

Figure 3:
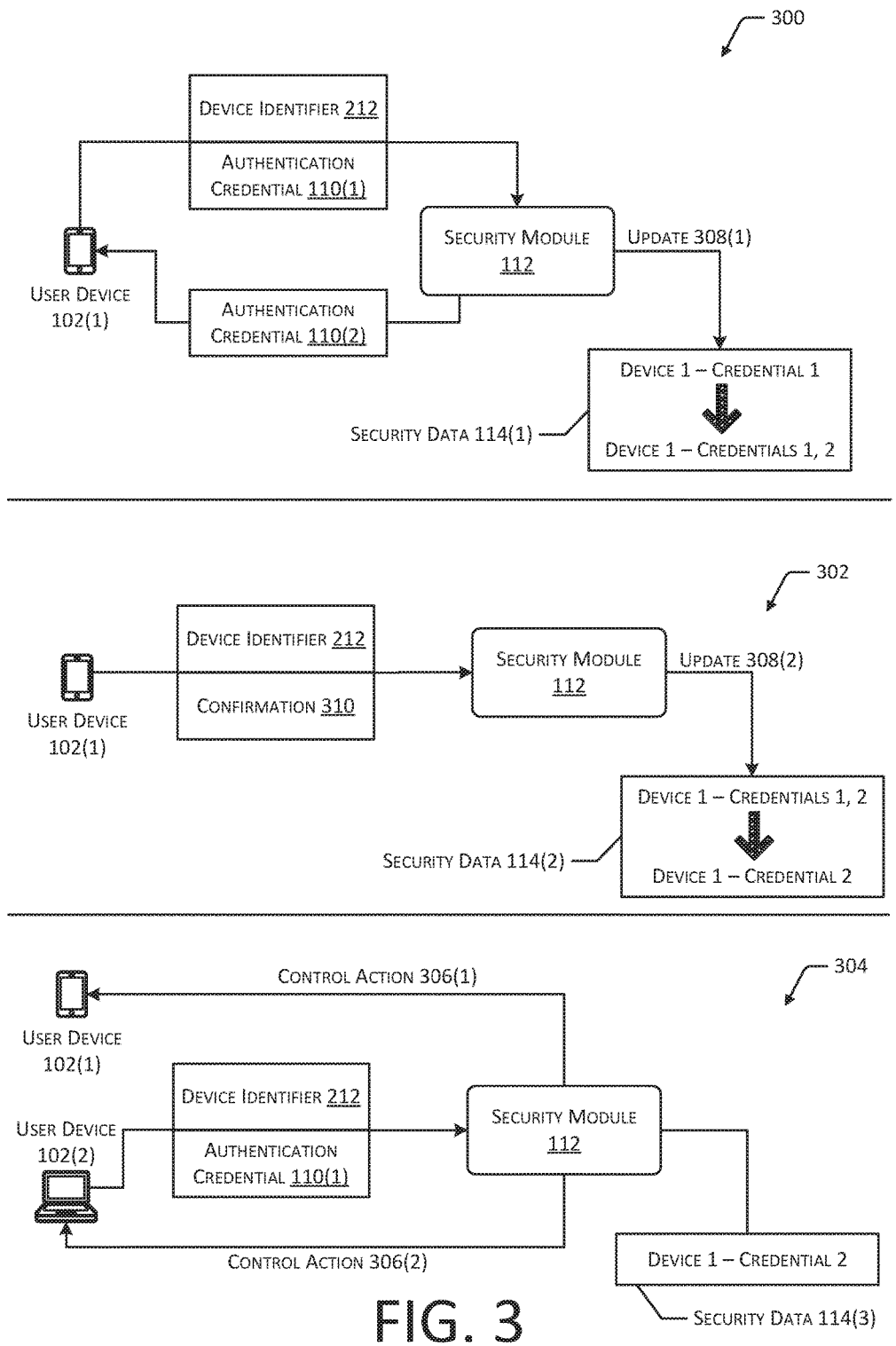
FIG. 3 depicts an example system at different times, illustrating establishment of a secure communication channel using authentication credentials.

FIG. 3 depicts an example system 300 at different times, illustrating establishment of a secure communication channel using authentication credentials 110. The system depicted at 300 illustrates a user device 102(1) providing a first authentication credential 110(1) to the security module 112 and receiving a second authentication credential 110(2). The system depicted at 302 illustrates the user device 102(1) confirming receipt and preparation of the second authentication credential 110(2). The system at 304 illustrates a second user device 102(2) providing the incorrect authentication credential 110(1) to the security module 112, causing one or more control actions 306 to be performed.

At 300, the user device 102(1) may provide a request 104 and a first authentication credential 110(1) to the authentication server(s) 108. The request may include a device identifier 212 indicative of the user device 102(1). A security module 112 associated with the authentication server(s) 108 may determine correspondence between the received authentication credential 110(1) and security data 114(1). For example, the security data 114(1) may include an indication of the device identifier 212 of the user device 102(1) associated with an indication of the first authentication credential 110(1). Because the received device identifier 212 associated with the request 104 and the accompanying authentication credential 110(1) would correspond to the security data 114(1), the request 104 may be processed (e.g., by providing the request 104 to the request processing module 116). The security module 112 may determine a second authentication credential 110(2) to be associated with the user device 102(1) and provide the second authentication credential 110(2) to the user device 102(1). The security module may also provide an update 308(1) to the security data 114. The update 308(1) may modify the security data 114 to indicate an association between the device identifier 212 of the user device 102(1) and the second authentication credential 110(2). In some implementations, the update 308(1) may not remove the association between the device identifier 212 and the first authentication credential 110(1) immediately upon providing the second authentication credential 110(2). For example, the user device 102(1) may provide a second request 104 before the second authentication credential 110(2) is received or before the second authentication credential 110(2) is prepared or use. Maintaining the association between the device identifier 212 and the first authentication credential 110(1) may prevent the performance of unnecessary control actions 306 with regard to the user device 102(1).

At 302, after receiving the second authentication credential 110(2) and preparing the second authentication credential 110(2) for use, the user device 102(1) may provide a confirmation 310 indicating receipt and preparation of the second authentication credential 110(2) to the authentication server(s) 108. Responsive to the confirmation 310, the security module 112 may provide a second update 308(2) to the security data 114(2) removing the association between the device identifier 212 of the user device 102(1) and the first authentication credential 110(1).

The system at 304 illustrates a second user device 102(2) providing the device identifier 212 associated with the first user device 102(1) and the first authentication credential 110(1) to the security module 112 of the authentication server(s) 108. For example, a malicious user, such as a man-in-the-middle (MITM) attack, may acquire an authentication credential 110(1) provided by one or more of the first user device 102(1) or the authentication server(s) 108. As shown in FIG. 3, the second user device 102(2) may provide the first authentication credential 110(1) in association with the device identifier 212 of the first user device 102(1) to attempt to access a service. However, the second update 308(2) provided to the security data 114(2) at 302 removed the association between the device identifier 212 and the first authentication credential 110(1). Therefore, the security module 112 may determine a lack of correspondence between the authentication credential 110(1) received from the second user device 102(2) and the security data 114(3). Based on this determination, one or more control actions 306 may be performed with regard to the first user device 102(1) and the second user device 102(2). For example, a first control action 306(1) may include providing a notification or a replacement authentication credential 110 to the first user device 102(1). A second control action 306(2) may include rejecting the request 104 provided by the second user device 102(2), preventing subsequent communications from the second user device 102(2), providing notifications indicative of the second user device 102(2) to one or more other computing devices or data repositories, and so forth. In some implementations, the control actions 306 performed with regard to one or more of the user devices 102 may include deleting data from one or more of the user devices 102.

In other cases, the second user device 102(2) may acquire a current authentication credential 110(2). For example, the second user device 102(2) may intercept the second authentication credential 110(2) as it is provided from the authentication server(s) 108 to the first user device 102(1). However, because the second authentication credential 110(2) may only be used in conjunction with a single request 104 before a subsequent authentication credential 110 is generated and provided to the user device 110(1), the potential damage that may be caused by the second user device 102(2) is reduced. Continuing the example, after the second user device 102(2) provides a request 104, associated with the device identifier 212 of the first user device 102(1), to access a service, a subsequent authentication credential 110 may be provided to the first user device 102(1). In addition to invalidating the authentication credential 110(2) used by the second user device 102(2), receipt of the subsequent authentication credential 110 may inform a user of the first user device 104(1) that a previous authentication credential 110 was compromised.

Figure 4:
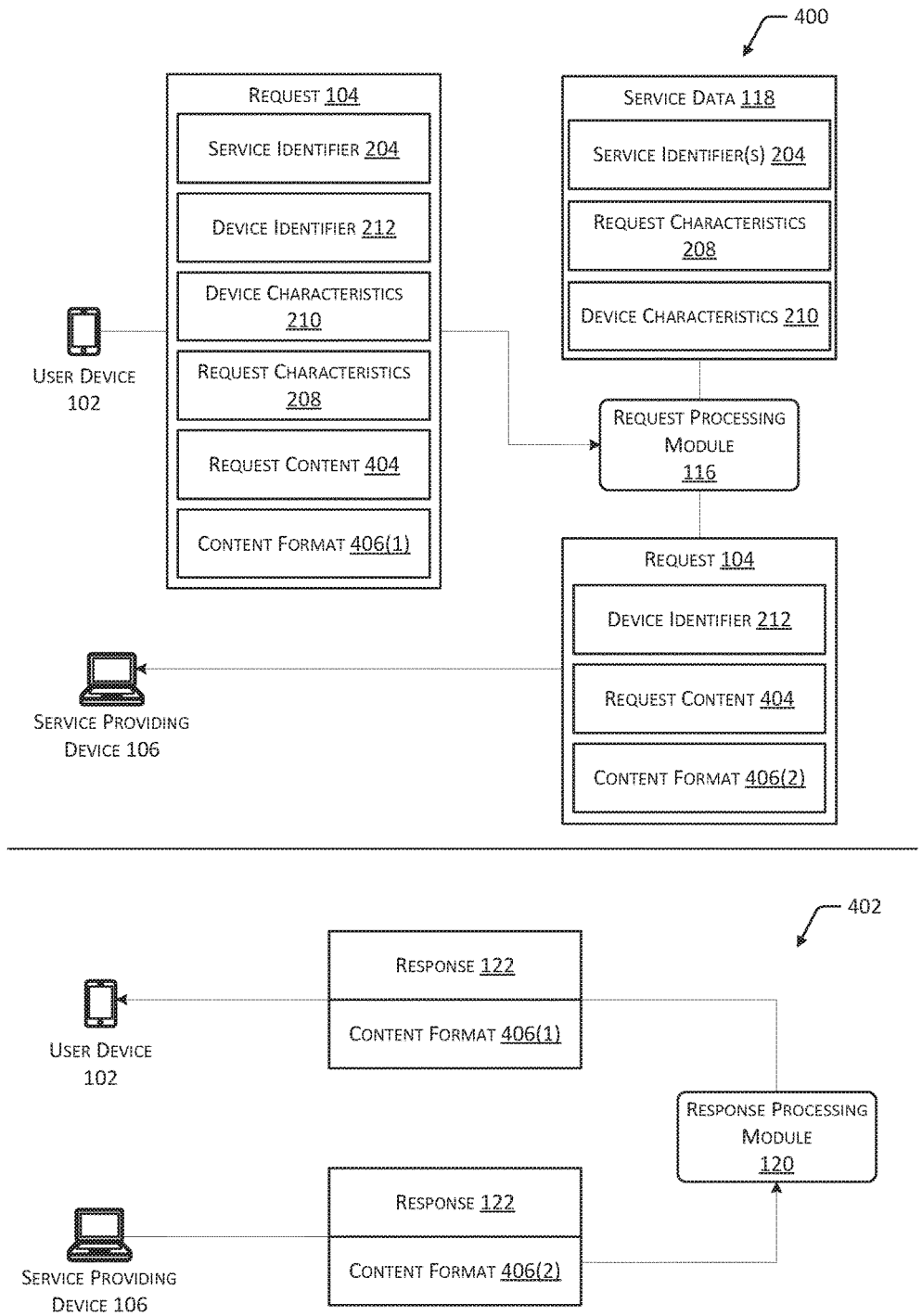
FIG. 4 depicts an example system at different times, illustrating transmission of requests and responses having different formats between user devices and service providing devices.

FIG. 4 depicts an example system 400 at different times, illustrating transmission of requests 104 and responses 122 having different formats between user devices 102 and service providing devices 106. The system at 400 illustrates a user device 102 providing a request 104 to the request processing module 116, which in turn provides at least a portion of the request 104 to the service providing device 106. The system at 402 illustrates the service providing device 106 providing a response 122 to the response processing module 120, which in turn provides at least a portion of the response 122 to the user device 102.

At 400, the user device 102 is shown providing a request 104 to the request processing module 116. The request 104 may include a service identifier 204 indicative of the service or service providing device 106 for which the request 104 is intended, as well as a device identifier 212 indicative of the user device 102 providing the request 104. The request 104 may also include one or more device characteristics 210 associated with the user device 102 such as a location, a device type, a communication route associated with the user device 102 or request 104, security features 206 associated with the user device 102, and so forth. The request 104 may further include request characteristics 208, such as a type or category associated with the request 104, particular fields, extensions, expressions, and so forth associated with the request 104. Request characteristics 208 may also include a frequency or number of instances that a particular service was requested, a particular request 104 was provided, or a particular user device 102 provided a request 104. Request characteristics 208 may also include one or more characteristics of the requested service, such as the type or category of service, whether the requested output includes sensitive or confidential information, and so forth. The request 104 may also include request content 404, which may include particular data, operations, expressions, calls, and so forth configured to manipulate or interact with the requested service. The request 104 may be provided by the user device 102 using a first content format 406(1).

The request processing module 116 may determine correspondence between at least a portion of the request 104 and service data 118. The service data 118 may associate service identifiers 204 with particular request characteristics 208 and device characteristics 210. For example, a service associated with the service identifier 204 received from the user device 102 may be configured to process requests 104 having particular request characteristics 208 or requests 104 from user devices 102 having particular device characteristics 210, while rejecting other requests 104. In other implementations, the service data 118 may indicate particular request content 404 or particular device identifiers 212 that may be permitted to access the requested service or the service providing device 106. If correspondence between the request 104 and the service data 118 is determined, at least a portion of the request 104 may be provided to the service providing device 106. In some implementations, the request processing module 116 may modify the content format 406(1) of the request 104 to a second content format 406(2) used by the service providing device 106. For example, the authentication server(s) 108 may perform a format negotiation process with the service providing device 106 by requesting an indication of one or more formats from the service providing device 106 or providing an indication of one or more formats to the service providing device 106. A response from the service providing device 106 may indicate the second content format 406(2) used by the service providing device 106. In other implementations, the service data 118 or a directory associating service identifiers 204 with content formats 406 may be accessed by the authentication server(s) 108 to determine the second content format 406(2).

The service providing device 106 may determine the particular manner in which the request content 404 provided by the user device 102 associated with the device identifier 212 may be processed and the content of the response 122. For example, the service providing device 106 may determine whether a particular user device 102 is authorized to request a particular service, the type(s) of output to include in the response 122, and so forth.

At 402, the service providing device 106 may provide a response 122 to the response processing module 120. In some implementations, the response processing module 120 may modify the response 122 from a format 406(2) associated with the service providing device 106 to a format 406(1) associated with the user device 102. As described previously with regard to FIG. 1, in some implementations, the response processing module may determine correspondence between at least a portion of the response 122 and device data 124 associated with the user device 102. For example, device data 124 may include indications of particular service identifiers 204, service characteristics, response content, and so forth that may be permitted or prevented from being provided to or output by the user device 102. One or more portions of the response 122 that correspond to the device data 124 may be provided to the user device 102.

Figure 5:
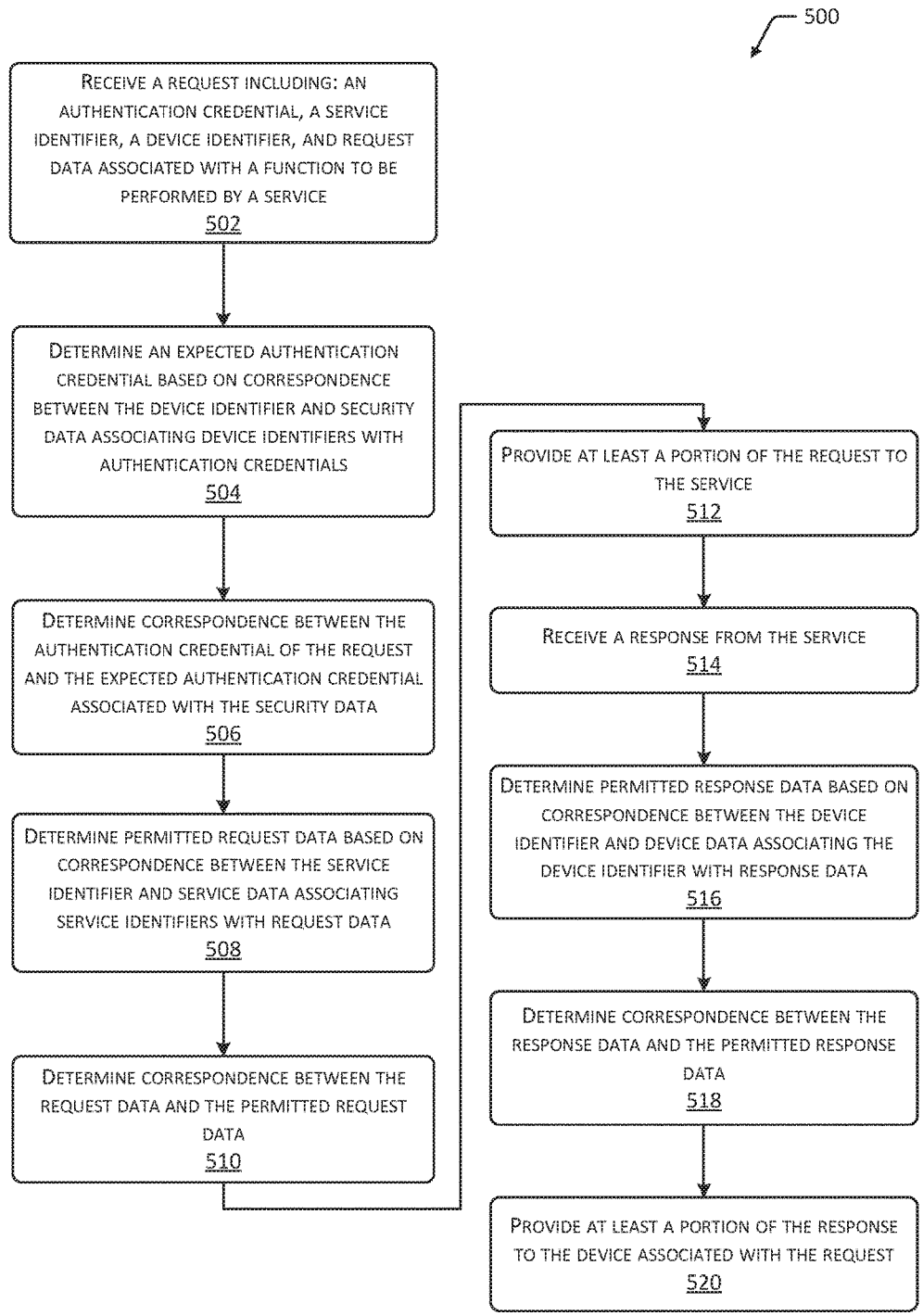
FIG. 5 is a flow diagram illustrating a method for establishing secure communications between a user device and a service providing device.

FIG. 5 is a flow diagram 500 illustrating a method for establishing secure communications between a user device 102 and a service providing device 106. Block 502 receives a request 104 including an authentication credential 110, a service identifier 204, a device identifier 212, and request data (e.g., request characteristics 208 and request content 404) associated with a function to be performed by a service. A request 104 may identify a particular service or service providing device 106 using one or more service identifiers 204. The request 104 may identify the user device 102 that provided the request using one or more device identifiers 212. In some implementations, the request 104 may also include device characteristics 210 associated with the user device 102, such as a type of device, a location of the device, software executing on the device, security features 206 associated with the device, and so forth. The authentication credential 110 may include one or more tokens, certificates, cookies, or other types of data that may be used as security features 206 to authenticate the user device 102.

Block 504 determines an expected authentication credential 110 based on correspondence between the device identifier 212 (associated with the request 104) and security data 114 associating device identifiers 212 with authentication credentials 110. For example, the security data may include one or more device identifiers 212, at least a portion of which may be associated with one or more authentication credentials 110. Correspondence between the security data 114 and the device identifier 212 associated with the request 104 may indicate that the device identifier 212 of the user device 102 associated with the request 104 has previously established trusted communications with the authentication server(s) 108, and that at least one valid authentication credential 110 is associated with the device identifier 212 of the user device 102.

Block 506 determines correspondence between the authentication credential 110 of the request 104 and the expected authentication credential 110 associated with the security data 114. If correspondence between the security data 114 and the authentication credential 110 of the request 104 is not determined, this may indicate that the request 104 includes an expired or invalid authentication credential 110. In other cases, the request 104 may lack an authentication credential 110. One or more control actions 306 may be undertaken responsive to a lack of correspondence between the security data 114 and the authentication credential 110 of the request 104. If correspondence between the security data 114 and the authentication credential 110 of the request 104 is determined, this may indicate that the authentication credential 110 associated with the request 104 is valid and not expired.

Block 508 determines permitted request data based on correspondence between the service identifier 204 and service data 118 associating service identifiers 204 with request data. For example, the service data 118 may include service identifiers 204 associated with one or more services. Each service identifier 204 may include one or more request characteristics 208, request content 404, device characteristics 210, or device identifiers 212 associated therewith. For example, a particular service may be configured to process requests 104 having certain fields, formats, expressions, content, and so forth. As another example, the particular service may be configured to process requests 104 from particular user devices 102, certain types of user devices 102, user devices 102 in particular geographic locations, user devices having particular security features 206, and so forth. In some implementations, if no portion of the request 104 corresponds to the service data 118, the authentication server(s) 108 may provide a notification indicative of a lack of correspondence to the user device 102 associated with the request 104. For example, the request 104 may include a type of expression that the service is not configured to process or that the particular user device 102 is not permitted to execute. As another example, if the request 104 includes a service identifier 204 that does not correspond to the service data 114, the service identifier 204 may be erroneous, associated with a service that is inactive, or associated with a service that has not established trusted communication with the authentication server(s) 108 such as by providing authentication data 202 or service data 118. If correspondence between the service identifier 204 and the service data 118 is determined, block 510 determines correspondence between the request data (associated with the request 104) and the permitted request data (associated with the service data 118).

Block 512 provides at least a portion of the request 104 to the service. In some implementations, the content format 406 of the request 104 may be modified from a format used by the user device 102 providing the request 104 to a format that may be used by the service or service providing device 106. The service may then process the received portion(s) of the request 104 and generate a response 122. Block 514 receives a response 122 from the service. In some implementations, the response 122 may include a service identifier 204 indicative of the service providing the response 122, a device identifier 212 indicative of the user device 102 associated with the request 104, and various content and characteristics indicative of the type of data contained in the response 122.

Block 516 determines permitted response data based on correspondence between the device identifier 212 (associated with the request 104) and device data 124 associating the device identifier 212 with response data. For example, device data 124 may include device identifiers 212 associated with one or more user devices 102. Each device identifier 212 may include one or more indications of response content or characteristics, service identifiers 204, identifiers associated with service providing devices 106, characteristics of services or service providing devices 106, and so forth. The content associated with a device identifier 212 may indicate the types of content able to be processed by the associated user device 102. Block 518 determines correspondence between the response data and the permitted response data. This determination may indicate one or more portions of the response 122 that may be processed by the user device 102 associated with the request. Block 520 provides at least a portion of the response 122 to the device associated with the request 104.

Figure 6:
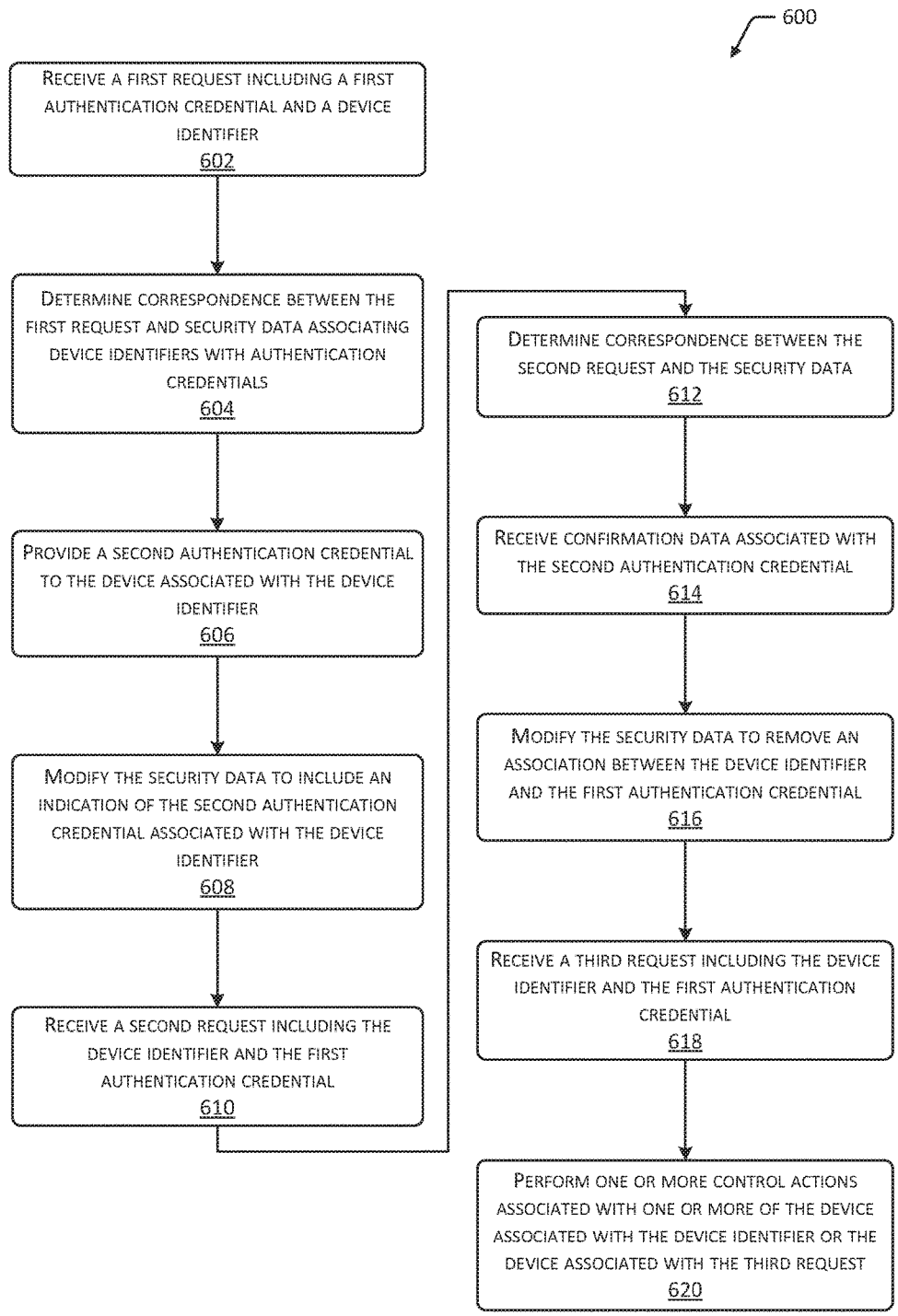
FIG. 6 is a flow diagram illustrating a method for modifying authentication credentials used in connection with a user device and performing control actions responsive to improper authentication credentials.

FIG. 6 is a flow diagram 600 illustrating a method for modifying authentication credentials 110 used in connection with a user device 102 and performing control actions 306 responsive to improper authentication credentials 110. Block 602 receives a first request 104(1) including a first authentication credential 110(1) and a device identifier 212. The first authentication credential 110(1) may include any type of token, certificate, cookie, or other type of data that may be used to authenticate a communication received from a user device 102. The request 104(1) may include any type of data indicative of an interaction with a service or a service providing device 106.

Block 604 determines correspondence between the first request 104(1) and security data 114 associating device identifiers 212 with authentication credentials 110. For example, a security module 112 associated with one or more authentication server(s) 108 may determine that the security data 114 includes an indication of the device identifier 212 associated with the request 104. The device identifier 212 of the security data 114 may include one or more indications of valid, non-expired authentication credentials 110 associated therewith. The security module 112 may determine that the authentication credentials 110 of the security data 114 that are associated with this device identifier 212 include the first authentication credential 110(1) associated with the first request 104(1). Based on this correspondence, at least a portion of the first request 104(1) may be provided to a request processing module 116 for additional processing or providing to a service.

Block 606 provides a second authentication credential 110(2) to the device associated with the device identifier 212. For example, a security policy associated with the security module 112 may include rotation (e.g., replacement) of authentication credentials 110 after each use. Therefore, after use of the first authentication credential 110(1) in association with the first request 104(1), the security module 112 may generate a second authentication credential 110(2) to replace the first authentication credential 110(2). The second authentication credential 110(2) may include any type of token, certificate, cookie, or other type of data that may be used to authenticate communications from a user device 102.

Block 608 modifies the security data 114 to include an indication of the second authentication credential 110(2) associated with the device identifier 212. Subsequent this modification, communications that include the device identifier 212 and the second authentication credential 110(2) may correspond to the security data 114. In some implementations, the association between the first authentication credential 110(1) and the device identifier 212 may be removed from the security data 114, indicative of the fact that the first authentication credential 110(1) has expired after use. In other implementations, the association between the first authentication credential 110(1) and the device identifier 212 may be retained in the security data 114 until a confirmation 310 associated with receipt and preparation of the second authentication credential 110(2) has been received.

For example, block 610 receives a second request 104(2) including the device identifier 212 and the first authentication credential 110(1). In some cases, a user device 102 may provide a second request 104(2), such as part of a multi-step process, after the second authentication credential 110(2) has been generated and provided to the user device 102, but prior to receipt of confirmation 310 from the user device 102. If the association between the first authentication credential 110(1) and the device identifier 212 has been retained in the security data 114, a request 104 that includes the first authentication credential 110(1) may correspond to the security data 114. Block 612 determines correspondence between the second request 104(2) and the security data 114.

Block 614 receives confirmation data associated with the second authentication credential 110(2). For example, after receipt of the second authentication credential 110(2) and preparation of the second authentication credential 110(2) for use, the user device 102 may provide a confirmation 310 to the authentication server(s) 108 indicating the second authentication credential 110(2). Responsive to this confirmation 310, block 616 may modify the security data 114 to remove an association between the device identifier 212 and the first authentication credential 110(1). Subsequent requests 104 that include the device identifier 212 and the first authentication credential 110(1) may therefore not correspond to the security data 114, responsive to which a control action 306 may be undertaken.

Block 618 receives a third request 104(3) including the device identifier 212 and the first authentication credential 110(1). Because the security data 114 no longer includes an association between the device identifier 212 and the first authentication credential 110(1), the third request 104(3) may not correspond to the security data 114. Responsive to this determination, block 602 may perform one or more control actions 306 associated with one or more of the device associated with the device identifier 212 or the device associated with the third request 104(3). For example, in some cases, a third party device may provide an anomalous or malicious request 104 using a device identifier 212 and authentication credential 110 obtained from the user device 102 that corresponds to the device identifier 212. One or more control actions 306 performed with regard to the device providing the third request 104(3) may include rejecting the request 104(3), terminating communication with the device, preventing subsequent communications with the device, providing an indication of the device to one or more other computing devices or data repositories, deleting data from the device, and so forth. Control actions 306 performed with regard to the user device 102 associated with the device identifier 212 may include providing notifications or subsequent access credentials 110, deleting data from the user device 102, and so forth.

Figure 7:
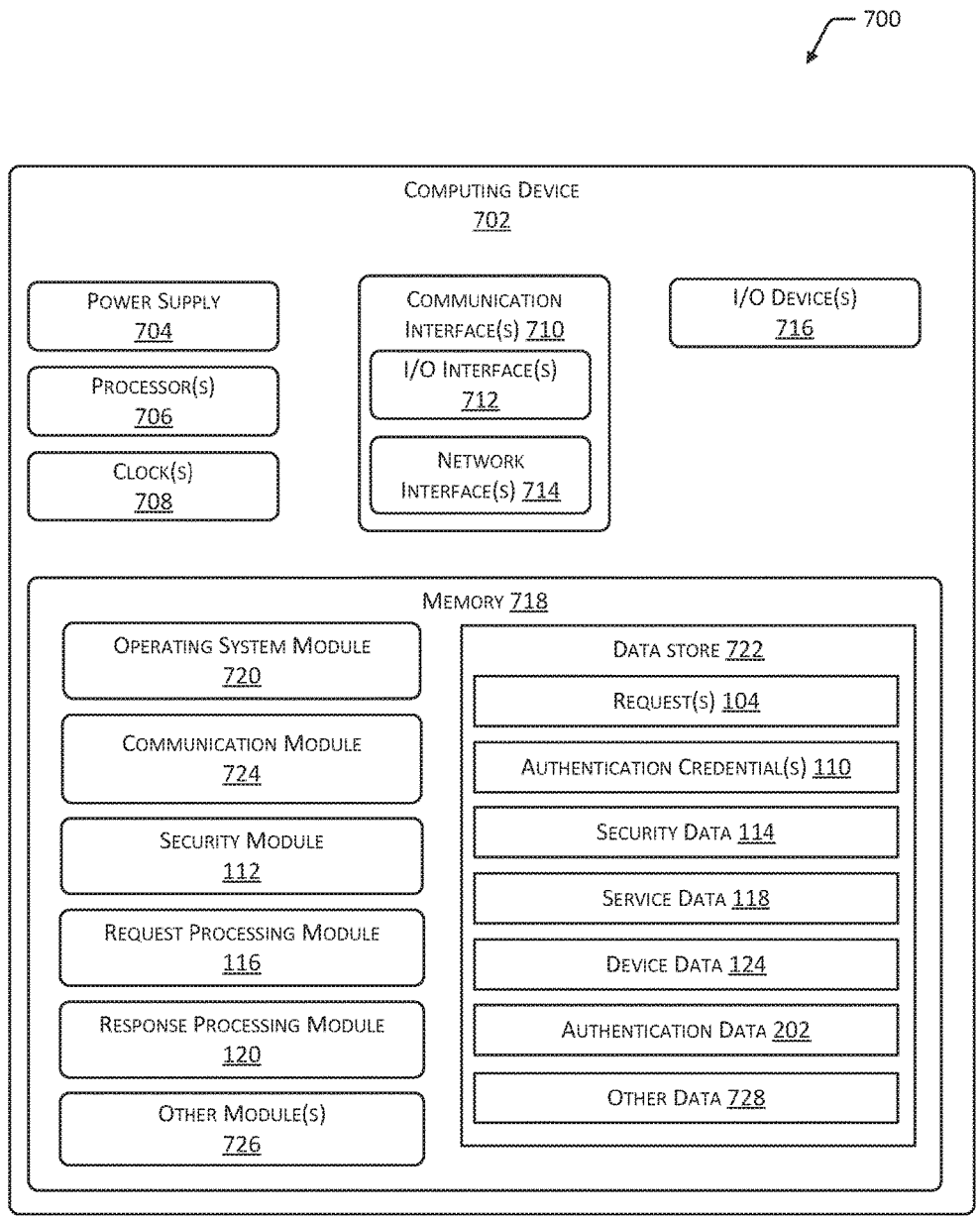
FIG. 7 is a block diagram illustrating a computing device within the scope of the present disclosure.

FIG. 7 is a block diagram 700 illustrating a computing device 702 within the scope of the present disclosure. The computing device 702 may include one or more user devices 102, service providing devices, authentication servers 108, or other computing devices 702 in communication therewith.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clocks 708 may provide information indicative of date, time, ticks, and so forth. For example, the processor(s) 706 may use data from the clock 708 to generate a timestamp, trigger a preprogrammed action, and so forth. In some implementations, data from the clock 708 may be used to determine expiration of one or more authentication credentials 110 based on the lapse of a length of time or the occurrence of one or more particular times.

The computing device 702 may include one or more communication interfaces 710, such as input/output (I/O) interfaces 712, network interfaces 714, and so forth. The communication interfaces 710 may enable the computing device 702, or components of the computing device 702, to communicate with other computing devices 702 or components of the other computing devices 702. The I/O interfaces 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O devices 716. The I/O devices 716 may include any manner of input device or output device associated with the computing device 702. For example, I/O devices 716 may include touch sensors, keyboards, mouse devices, microphones, image sensors (e.g., cameras), scanners, displays, speakers, haptic devices, printers, and so forth. In some implementations, the I/O devices 716 may be physically incorporated with the computing device 702 or may be externally placed.

The network interfaces 714 may be configured to provide communications between the computing device 702 and other devices, such as the I/O devices 716, routers, access points, and so forth. The network interfaces 714 may include devices configured to couple to one or more networks including LANs, wireless LANs, WANs, wireless WANs, and so forth. For example, the network interfaces 714 may include devices compatible with Ethernet, Wi-Fi, Bluetooth, ZigBee, Z-Wave, 3G, 4G, LTE, and so forth.

The computing device 702 may include one or more busses or other internal communications hardware or software that allows for the transfer of data between the various modules and components of the computing device 702.

As shown in FIG. 7, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 722 and one or more of the following modules may also be stored in the memory 718. The modules may be executed as foreground applications, background tasks, daemons, and so forth. The data store 722 may use a flat file, database, linked list, tree, executable code, script, or other data structure to store information. In some implementations, the data store 722 or a portion of the data store 722 may be distributed across one or more other devices including other computing devices 702, network attached storage devices, and so forth.

A communication module 724 may be configured to establish communications with one or more other computing devices 702. The communications may be authenticated, encrypted, and so forth.

The memory 718 may store the security module 112. The security module 112 may determine correspondence between requests 104 and security data 114. The security data 114 may associate device identifiers 212 with authentication credentials 110. For example, a request 104 may include a device identifier 212 indicative of the computing device 702 providing the request 104. Correspondence between the device identifier 212 of the request 104 and an associated device identifier 212 of the security data 114 may be used to determine valid authentication credentials 110 for the computing device 702 providing the request 104. Correspondence between the authentication credential 110 received with a request 104 and the authentication credentials 110 of the security data 114 may indicate whether the request 104 may be authenticated. In some implementations, the security module 112 may perform similar functions with regard to responses 122 received from services. For example, access credentials 110 or other security features 206 may be received in connection with responses 122. In such cases, the security data 114 may also associate service identifiers 204 with access credentials 110 or security features 206. The security module 112 may also be used to establish trusted communications between computing devices 702. For example, the security module 112 may determine authentication data 202 from computing devices 702, the authentication data 202 associating identifiers of the computing devices 702 with corresponding security features 206. In some implementations, the security module 112 may use an AAA framework or another type of multi-factor authentication process to authenticate computing devices 702.

The memory 718 may also store the request processing module 116. The request processing module 116 may determine correspondence between requests 104 and service data 118. The service data 118 may associate service identifiers 204 with indications of request characteristics 208, device characteristics 210, device identifiers 212, and request content 404. Correspondence between the service data 118 and the request 104 may determine portions of the request 104 that a service is both permitted and configured to process. In some implementations, the request processing module 116 may provide notifications regarding one or more portions of a request 104 that do not correspond to the service data 118. In some implementations, the request processing module 116 may modify the format of the request 104 from a first content format 406(1) associated with a requesting device to a second content format 406(2) that may be used by a service.

The memory 718 may further store the response processing module 120. The response processing module 120 may determine correspondence between responses 122 and device data 124. In some implementations, permission to provide a response 122 to a requesting device and the capability of the requesting device to process the response 122 may be assumed, and use of the response processing module 120 may be omitted. The device data 124 may indicate particular characteristics or types of content associated with the response 122 that may be processed, and other types of content that may be rejected. In some implementations, the response processing module 120 may modify the format of the response 122 from a content format 406(2) associated with the service to a different content format 406(1) that may be processed by the requesting device.

Other modules 726 may also be present in the memory 718. For example, encryption modules may be used to encrypt and decrypt communications between computing devices 702. In some cases, the security module 112 or one or more other modules may require that communications be encrypted before establishing trusted communication with other computing devices 702. The other modules 726 may also include modules for logging interactions with services. For example, if an improper access credential 110 is received, an indication of the improper access credential 110 or the computing device 702 associated with the improper access credential 110 may be stored or provided to other computing devices 702 to facilitate identification of potentially malicious users or processes.

Other data 728 within the data store 722 may include user input data, such as configurations and settings associated with computing devices 702. Other data 728 may include security data, such as encryption keys and schema, access credentials, and so forth.

In different implementations, different computing devices 702 may have different capabilities or capacities. For example, authentication servers 108 may have significantly more processor 706 capability and memory 718 capacity compared to the processor 706 capability and memory 718 capacity of user devices 102 or service providing devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors configured to execute the computer-executable instructions to:
receive a first request from a user device, the first request including a device identifier associated with the user device, a service identifier associated with a service, an initial authentication credential, and request data associated with a function to be performed by the service, the function including one or more of providing an application, an update to the application, or an output from executing the application from the service to the user device;
access security data associating device identifiers with authentication credentials;
determine correspondence between the device identifier associated with the user device and a particular device identifier of the security data, the correspondence indicating a first expected authentication credential associated with the particular device identifier;

determine correspondence between the initial authentication credential of the user device and the first expected authentication credential of the security data, wherein the correspondence indicates that the initial authentication credential is valid;

establish a communication channel with the user device based at least in part on the correspondence between the initial authentication credential and the first expected authentication credential, the communication channel configured to provide one or more of the application, the update, or the output from the service to the user device;

access service data associating service identifiers with particular request data;

determine correspondence between the request data associated with the request and the particular request data associated with the service data, the correspondence indicating one or more of: the service being configured to process the request or the user device being authorized to provide the request;

based on the correspondence between the request data and the service data, provide at least a portion of the request to the service;

receive a response from the service, the response including the one or more of the application, the update, or the output;

in response to the correspondence between the initial authentication credential and the first expected authentication credential, generate a second authentication credential;

modify the security data to associate the second authentication credential with the particular device identifier, forming modified security data;

provide at least a portion of the response and the second authentication credential to the user device via the communication channel;

receive a second request, the second request including the device identifier associated with the user device and the initial authentication credential;

determine correspondence between the device identifier associated with the user device and the particular device identifier of the modified security data, the correspondence indicating a second expected authentication credential associated with the particular device identifier;

determine a mismatch between the initial authentication credential and the second expected authentication credential; and based at least in part on the mismatch, perform a control action associated with the second request.

2. The system of claim 1, further comprising computer-executable instructions to:

determine an access request associated with the user device;

provide an interface requesting authentication data to the user device;

receive the authentication data from the user device, wherein at least a portion of the authentication data includes data generated external to the system that identifies the user device;

responsive to receipt of the authentication data, generate the initial authentication credential and provide the initial authentication credential to the user device; and modify the security data to include an indication of the initial authentication credential.

3. The system of claim 1, further comprising computer-executable instructions to:

determine a first format associated with the request received from the user device;

determine a second format associated with the service by one or more of:

determining the second format based on the service data;

providing a request for data indicative of the second format to the service; or accessing a directory associating service identifiers with formats;

modify the at least a portion of the request from the first format to the second format prior to providing the at least a portion of the request to the service;

determine the second format associated with the response received from the service; and modify the at least a portion of the response from the second format associated with the service to the first format associated with the user device prior to providing the at least a portion of the response to the user device.

4. The system of claim 1, wherein the security data further associates periods of time with the authentication credentials, the system further comprising computer-executable instructions to:

determine expiration of a period of time associated with the second authentication credential;

generate a third authentication credential;

modify the modified security data to associate the third authentication credential with the particular device identifier and disassociate the second authentication credential from the particular device identifier; and provide the third authentication credential to the user device.

5. A method comprising:

receiving a first request from a user device, the first request including a first authentication credential;

determining correspondence between the first authentication credential and security data indicative of one or more expected authentication credentials, the one or more expected authentication credentials including the first authentication credential, wherein the correspondence between the first authentication credential and the security data indicates that the first authentication credential is valid;

in response to determining that the first authentication credential is valid, modifying the one or more expected authentication credentials to include a second authentication credential;

responsive to receiving the first request, providing the second authentication credential to the user device;

receiving a second request from the user device, the second request including the first authentication credential;

determining correspondence between the first authentication credential and the security data, the correspondence indicating that the one or more expected authentication credentials associated with the user device include the second authentication credential; and performing a control action based at least in part on the correspondence between the first authentication credential and the security data.

6. The method of claim 5, further comprising:
requesting confirmation associated with the second authentication credential from the user device; and
responsive to receiving the second request including the first authentication credential, determining that the confirmation associated with the second authentication credential has not been received and that the security data indicates that the first authentication credential is valid;
wherein the control action includes accepting the second request.

7. The method of claim 5, wherein the security data associates one or more periods of time with the one or more authentication credentials, the method further comprising:
determining an end of a period of time associated with the second authentication credential;
modifying the one or more expected authentication credentials to remove the second authentication credential and to include a third authentication credential; and
providing the third authentication credential to the user device.

8. The method of claim 5, wherein performing the control action includes providing a signal to a device associated with the second request, the signal configured to cause one or more of: deletion of data associated with the device or termination of communication with the device.

9. The method of claim 5, further comprising:
receiving a notification indicative of a security failure associated with the user device;
modifying the security data to remove at least one authentication credential associated with the user device; and
providing a signal to the user device, the signal configured to delete data stored in association with the user device.

10. The method of claim 5, further comprising:
determining correspondence between the first request and service data indicative of one or more of request types or user devices associated with a service;
based on the correspondence between the first request and the service data, providing at least a portion of the first request to the service;
receiving a response from the service, the response including one or more of an application, an update to the application, or an output associated with the application; and
providing the response to the user device via a communication channel established with the user device responsive to the correspondence between the first authentication credential and the security data.

11. The method of claim 10, further comprising:
requesting authentication data from the service;
receiving the authentication data from the service, wherein at least a portion of the authentication data is generated by the service or a computing device associated with the service and identifies at least one of the computing device or the service; and
responsive to the receiving of the authentication data, generating the service data indicative of the one or more of the request types or the user devices associated with the service.

12. The method of claim 10, further comprising:
determining a first format associated with the service by one or more of:
accessing the service data;
providing a request for data indicative of the first format to the service; or
accessing a directory associating service identifiers with formats;
modifying the at least a portion of the request to the first format;
determining a second format associated with the user device; and
modifying at least a portion of the response to the second format.

13. The method of claim 5, further comprising:
requesting authentication data from the user device;
receiving the authentication data from the user device, wherein at least a portion of the authentication data includes data generated by the user device that identifies the user device;
responsive to the receiving of the authentication data, generating the first authentication credential; and
providing the first authentication credential to the user device.

14. The method of claim 5, further comprising:
requesting confirmation associated with the second authentication credential from the user device;
receiving the confirmation from the user device;
modifying the security data to indicate that the first authentication credential is invalid; and
responsive to receiving the second request including the first authentication credential, determining that the first authentication credential is invalid, wherein the control action includes rejecting the second request.

15. A system comprising:
one or more memories storing computer-executable instructions; and
one or more hardware processors configured to execute the computer-executable instructions to:
determine first authentication data and service data associated with a service, the service data indicating characteristics of one or more of a first request or a user device permitted to access the service, wherein the characteristics include one or more of: a communication route, a location, or a security feature associated with the user device;
determine second authentication data associated with the user device;
responsive to the second authentication data, provide a first authentication credential to the user device;
generate security data including an indication of the first authentication credential;
receive the first authentication credential and the first request to access the service from the user device;
determine correspondence between the first authentication credential and the security data, wherein the correspondence indicates that the first authentication credential is valid;
determine request characteristics associated with the first request, the request characteristics indicating the one or more of the communication route, the location, or the security feature associated with the user device;
determine correspondence between at least a portion of the request characteristics and the service data;
provide the at least a portion of the first request to the service;
receive a response from the service;
provide at least a portion of the response to the user device;
responsive to the first authentication credential being valid, modify the security data to include an indication of a second authentication credential; and
provide the second authentication credential to the user device.

16. The system of claim 15, further comprising computer-executable instructions to:
- receive a second request, subsequent to the first request, from the user device, the second request including the first authentication credential;
- determine that the security data includes the indication of the second authentication credential;
- perform a control action based at least in part on the correspondence between the first authentication credential and the security data.

17. The system of claim 16, further comprising computer-executable instructions to:
- request confirmation associated with the second authentication credential from the user device;
- wherein the second request including the first authentication credential is received prior to receiving the confirmation; and
- wherein the control action includes accepting the second request.

18. The system of claim 16, further comprising computer-executable instructions to:
- request confirmation associated with the second authentication credential from the user device;
- receive the confirmation from the user device; and
- modify the security data to remove the indication of the first authentication credential;
- wherein the control action includes one or more of deleting data from the user device or terminating communication with the user device.

19. The system of claim 15, further comprising computer-executable instructions to:
- provide, to the service, particular service data associated with one or more second services; and
- receive an indication of at least a portion of the particular service data from a device associated with the service;
- wherein the service data associated with the service includes the at least a portion of the particular service data.

20. The system of claim 15, wherein the service data further includes an indication of one or more of:
- a device type associated with the user device;
- a request type associated with the first request; or
- a device identifier associated with the user device.

* * * * *